United States Patent [19]

Schürmann

[11] Patent Number: 5,163,732
[45] Date of Patent: Nov. 17, 1992

[54] ADJUSTABLE ROOF PLATE

[75] Inventor: Erich Schürmann, Sendenhorst, Fed. Rep. of Germany

[73] Assignee: Farmont Produktion GmbH & Co. KG, Dusseldorf, Fed. Rep. of Germany

[21] Appl. No.: 803,777

[22] Filed: Dec. 5, 1991

Related U.S. Application Data

[63] Continuation of Ser. No. 601,887, Oct. 23, 1990, abandoned.

[30] Foreign Application Priority Data

Oct. 24, 1989 [DE] Fed. Rep. of Germany ....... 3935273

[51] Int. Cl.⁵ .................................................. B60J 7/00
[52] U.S. Cl. .................... 296/223; 296/216; 49/324; 74/89.15; 291/252; 291/340; 291/DIG. 61
[58] Field of Search .................. 296/223, 216; 49/324; 74/89.15; 292/58, 251, 241, 340, 341.15, DIG. 61

[56] References Cited

U.S. PATENT DOCUMENTS

| | | | |
|---|---|---|---|
| 2,121,784 | 6/1938 | Busby | 292/58 X |
| 2,177,931 | 10/1939 | Pierson et al. | 49/324 |
| 4,570,992 | 2/1986 | Furst et al. | 296/223 |
| 4,618,182 | 10/1986 | Farmont | 296/223 |

FOREIGN PATENT DOCUMENTS

| | | | |
|---|---|---|---|
| 2351270 | 4/1975 | Fed. Rep. of Germany | |
| 3228699 | 2/1983 | Fed. Rep. of Germany | 296/223 |
| 664131 | 8/1929 | France | 292/241 |

*Primary Examiner*—Dennis H. Pedder
*Attorney, Agent, or Firm*—Tarolli, Sundheim & Covell

[57] ABSTRACT

The invention relates to an openable roof plate especially for vehicles which is joined in an articulated manner by one of its longitudinal edges to a roof frame which can be secured to the vehicle roof, and which is equipped with an opening and closing device engaging on its other longitudinal edge, a helical spring being used which is connected to a drive nut which can be set into rotation by an operating device in such a way that opening or closing of the roof plate can thereby be achieved.

7 Claims, 2 Drawing Sheets

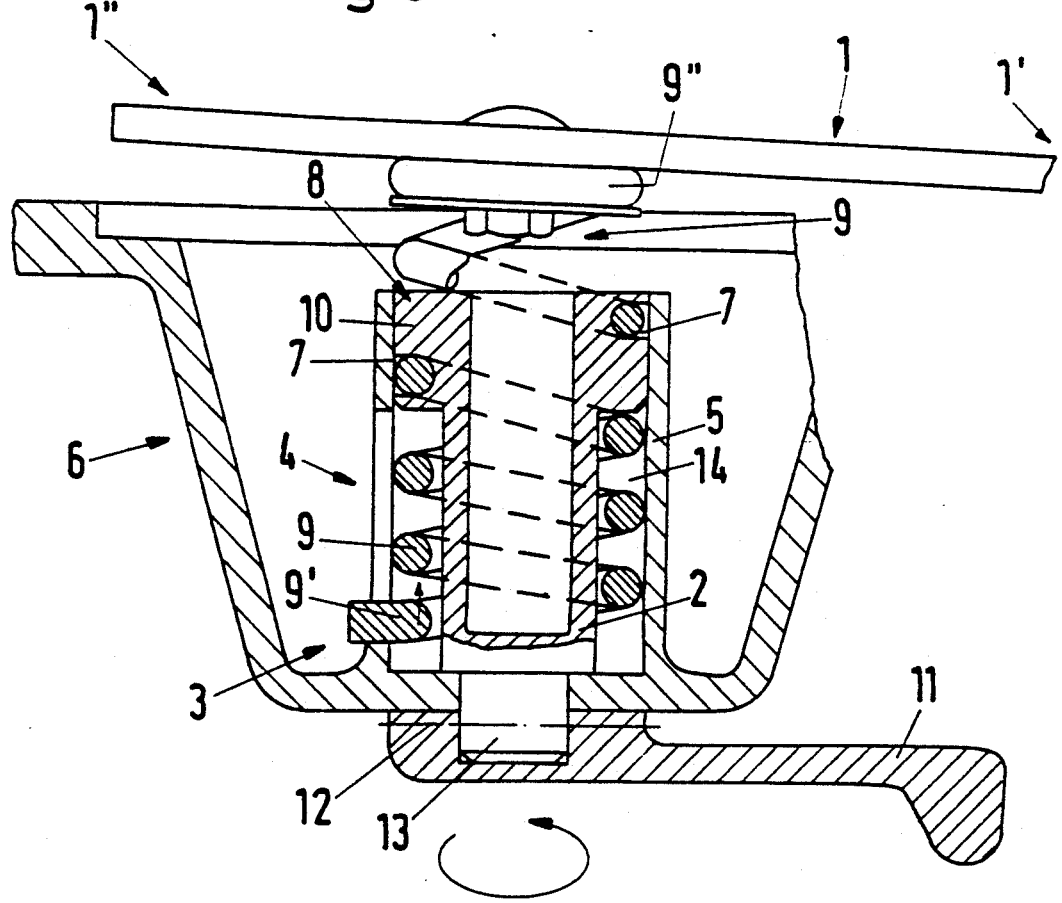

ADJUSTABLE ROOF PLATE

This is a continuation of copending application Ser. No. 07/601,887, filed on Oct. 23, 1990, now abandoned.

The invention relates to an openable roof plate which is joined in an articulated manner by a first edge to a roof frame and which is equipped with an opening and closing device engaging on a second edge lying opposite the first edge, this opening and closing device a) being secured by its upper end to the roof plate, b) being directly or indirectly mounted below its upper end to the allocated roof frame, and c) having a drive nut in the thread of which coils of an opening and closing element engage.

Openable roof plates of this (generic) type are known, in particular from published German patent specification 23 51 270. The roof plates are generally curved convexly outwards and their edge region can be laid in or on a corresponding seal on the roof frame. In order to achieve a uniform and tight positioning of the roof plate on the roof frame or the seal, it is necessary for the closing device for the roof plate to be operated by great closing forces. These closing forces must as a rule be great enough for the roof plate to elastically deform and flatten in its closed position so that its edges lie against the roof frame or the seal.

The hitherto known generic devices for the purpose of opening and closing the roof plate, in particular according to published German patent specification 23 51 270, are very costly.

The aim of the invention is to produce an opening and closing device for the openable roof plate, which device is constructed as simply as possible.

This aim is achieved in that the opening and closing element is a helical spring. Such a roof plate can be mounted—for instance—in a vehicle roof, the roof frame existing on the vehicle roof or being securable to the vehicle roof.

Advantageous embodiments of the subject of the invention, which guarantee in particular a large opening distance, most extensive noise prevention and the use of as few components as possible, are contained in further claims.

According to the invention, it is suggested that the opening and closing of the roof plate is operated by a helical spring which is effective between the roof plate and the roof of—for instance—a vehicle, and the upper end of which is secured to the roof plate. One or more of the coils of the helical spring engage in a drive nut which is equipped with corresponding threads. Since this drive nut is secured to the associated vehicle roof, i.e. usually to the roof frame, so as to be rotatable and preferably altitude-tested, the helical spring is guided up and down by a rotary movement of this drive nut and the roof plate is thereby set in an open position of any desired size or in the closed position. The advantage of the helical spring is that it can be mounted in the roof frame on a small storage space, the spring then being compressed to a greater or lesser extent and in extreme cases the threads lying tightly on top of each other, and that it is mounted securely and firmly in the drive nut so that rattling cannot occur either when the roof plate is closed or when the roof plate is open.

Furthermore, the helical spring provides the possibility of using a double type of spring, i.e., mounting (nesting) two springs one inside the other so that each of the springs can be constructed from relatively thin spring steel and can thus be manufactured inexpensively. The helical spring (or double spring) may—for instance—be formed of round or flat spring steel.

Limitation of the upward movement can be achieved by the end of the spring being deflected, which end can be guided in a groove or a slit of a pot (housing or cage) accommodating the helical spring and/or which is positioned on the drive nut on the underside of the thread region of the same.

The aforesaid components to be used according to the invention are not subject to any particular special conditions regarding size, shape, choice of material and technical conception, with the result that the known selection criteria in the relevant field of application can be applied without limitation.

Further details, characteristics and advantages of the subject of the invention arise from the following description of the accompanying drawings in which, as an example, a preferred embodiment of an opening and closing device according to the invention for a roof plate is shown.

The drawings show:

FIG. 3 is a different opening position, in which the roof plate is not so far open, of the same opening and closing device in the representation according to FIG. 1.

Figure 2:
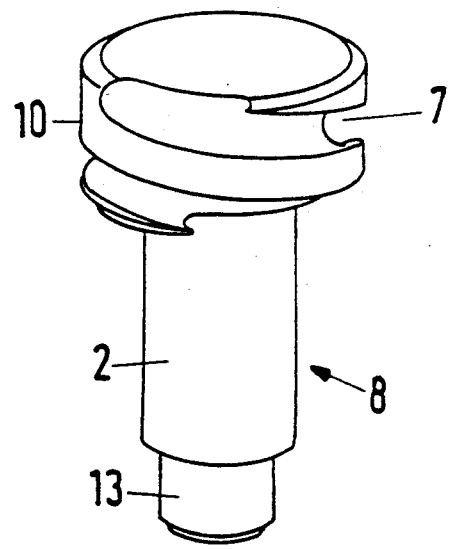
FIG. 2 is a perspective representation of the drive nut of the same opening and closing device.

In the drawing, a roof plate 1 is shown which can be made of glass, synthetic material, metal or the like and which can be provided with or without a frame. This roof plate 1 is guided in an articulated manner on a roof frame 6 of a roof opening, particularly in a vehicle roof, at the (front) end of the roof opening, which end is not shown and is on the right of the drawing. Arrangements of this type are known per se, from published German patent specification 23 51 270 for example, and therefore need no further explanation. The opening and closing device shown in FIG. 1 is provided on the rear part of the roof plate between the roof plate and the roof frame 6 of the roof opening.

In the case of the opening and closing device, the connection between the fixed roof frame 6 and the actual roof plate 1 is formed solely by a helical spring which serves as a compression and tension means, and the lower end of which, in the embodiment represented, is not fixedly connected to the roof frame 6, but is mounted so as to be height-adjustable. The helical spring 9 is guided in a pot-like profile 5 of the roof frame 6, the pot-like profile having a vertically extending slit 4 in the form of an opening, in which opening the lower deflected end 3 of the helical spring 9 engages. By these means, movement of the helical spring upwards and downwards is limited.

A drive nut 8 is mounted on the roof frame 6 inside the pot-like profile 5, which drive nut, in the embodiment represented, comprises a slender, cylindrical lower part 2, a thickened upper head-region 10 and a (more slender) drive journal 13. An entire thread 7 is formed in the head region 10. The thread can also be longer, which however, unnecessarily increases the overall height; the thread can also be shorter to a certain extent. The given embodiment of a complete thread has proved to be particularly advantageous. The form of the thread 7 is adapted to the form of the helical spring as regards diameter, thread pitch and cross-section this can be seen particularly clearly from FIGS. 1 and 3.

Figure 1:
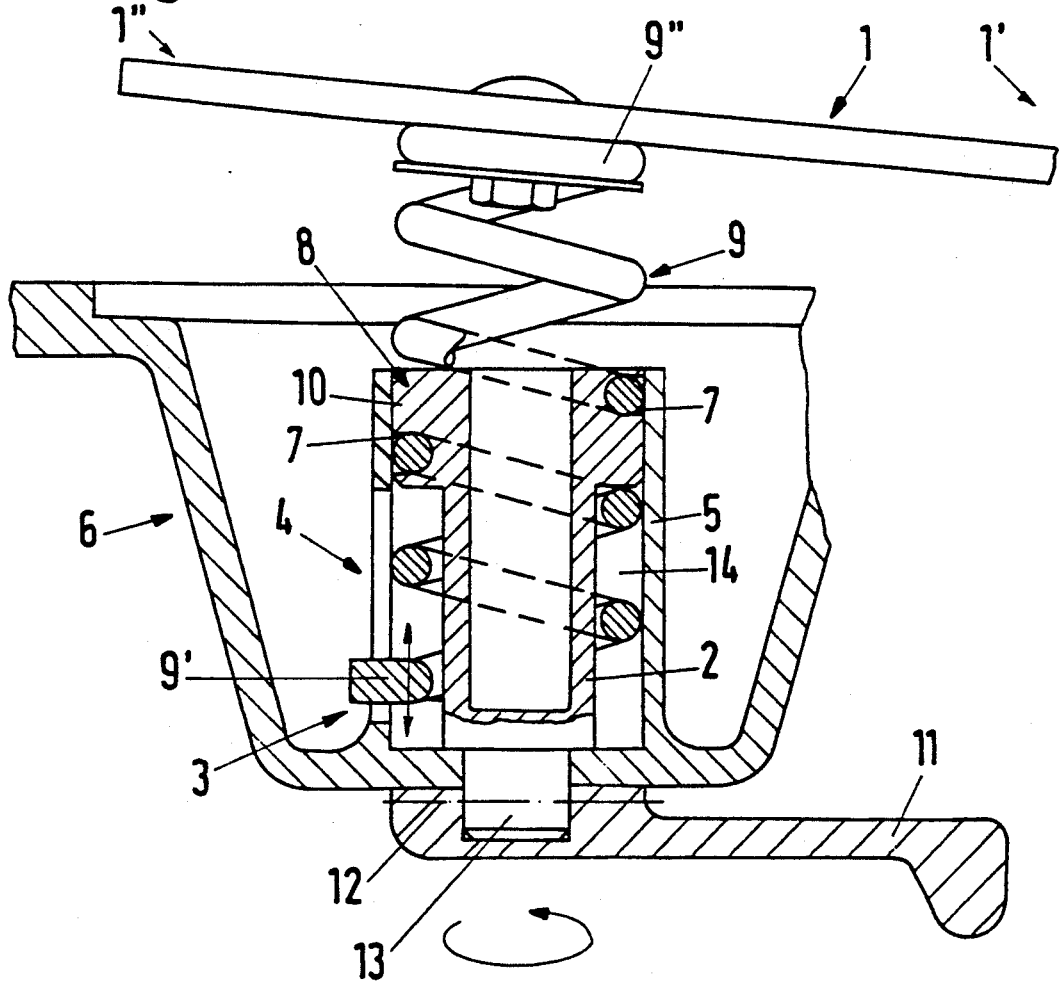
FIG. 1 is a vertical section of an opening and closing device according to the invention.

As can be seen from the representation in FIG. 1, the helical spring 9 secured to the roof plate 1 is guided downwards in the thread 7 in the head region 10, whereas the helical spring 9 is free from this type of guiding in the region of the cylindrical lower part 2.

The lower end of the drive nut 8 is connected, in the embodiment represented, to an operating lever 11 in the region of the drive journal 12 so as to be torsion resistant, a fixed height of the drive nut 8 being simultaneously achieved by this torsion-resistant connection which is indicated in FIGS. 1 and 3 by the broke line 12.

If the operating lever 11 is operated, the helical spring 9 is forced upwards or downwards by the rotary movement of the drive nut 8 and the roof plate 1 is thereby simultaneously opened or closed. If, during closing, the lower end 3 of the spring comes to be positioned on the roof frame or on the lower end of the slit 4, the roof plate is still not necessarily closed. In such a case, provided for in FIG. 1, further rotation of the drive nut 8 (in the closing direction) leads to compression of the region of the helical spring 9 located below the drive nut—this can be seen from FIG. 3. The zone which is formed by the cylindrical lower part 2 of the drive nut 8 and which forms the storage space 14 serves to accommodate this spring region. By these means, a relatively wide opening of the roof plate in comparison with the requisite overall height of the opening and closing device is possible. It is also, fundamentally, possible to keep the lower end of the spring fixed, i.e. not to let it move up and down.

It is possible, without being shown in more detail in the drawing, to use several, in particular two helical springs, i.e. to nest several helical springs one inside the other so that by these means each of these helical springs can have a smaller wire diameter.

The advantage of the opening and closing device according to the invention can be seen in that, amongst other things, a simple helical spring 9 can used both as an opening element and as a closing element. In the relaxed state, such a spring has, in particular, viewed over its length, a constant pitch. Furthermore, as already explained, use of a multiple spring is possible, whereby expenditure for the single helical spring is reduced. The helical spring is generally only fixed above on the roof plate 1. The whole arrangement has no parts which can freely move, i.e. rattling is prevented in this region. Good guiding in the pot-like profile 5 is simultaneously achieved by the design according to the invention; both a round spring steel and a flat spring steel can be used. The opening and closing device comprises a very few individual parts. The spring can be rigidly secured to the roof plate by reason of its flexural elasticity.

Having described a specific embodiment of the present invention the following is claimed:

1. An openable roof plate which is equipped with an opening and closing device, the opening and closing device a) having an upper end and a lower end, being secured by its upper end to the roof plate, b) being mounted below its upper end to a roof frame, and c) having a drive nut with a thread which coils of an opening and closing element engage, characterized in that the opening and closing element is a helical spring (9).

2. An openable roof plate according to claim 1, characterized in that the helical spring (9) is formed of round spring steel.

3. An openable roof plate according to claim 1, characterized in that the lower end of the helical spring (9) is movable up and down.

4. An openable roof plate according to claim 3, characterized in that the lower end (3) of the spring is deflected and guided in a housing engaging round the helical spring.

5. An openable roof plate according to claim 4, characterized in that the housing has an end stop for the end (3) of the spring.

6. An openable roof plate according to claims 3 or 4, characterized in that the lower end (3) of the spring is positioned on the underside of the thread of the drive nut.

7. An openable roof plate according to claim 1, characterized by a storage space (14) provided below the thread of the drive nut to accommodate the lower end of the helical spring (9) in a relaxed or tensioned state of the helical spring.

* * * * *